March 31, 1936.  M. M. PETERSON  2,036,075
FISH LURE
Filed May 31, 1933
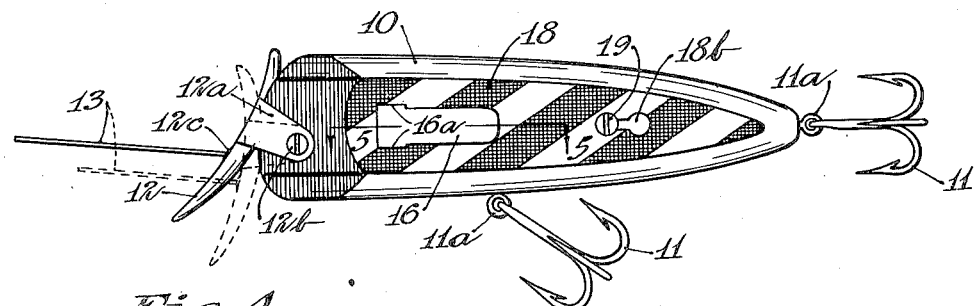
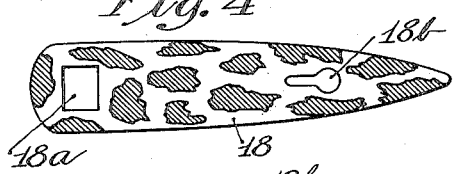
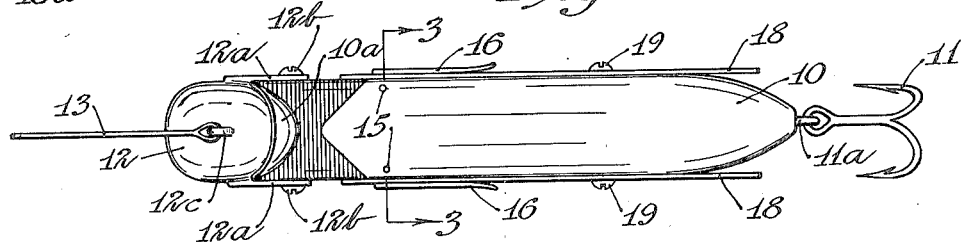
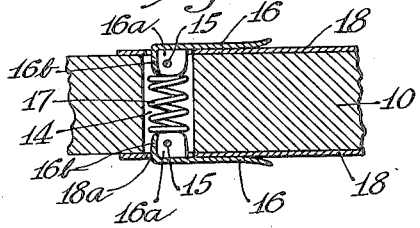
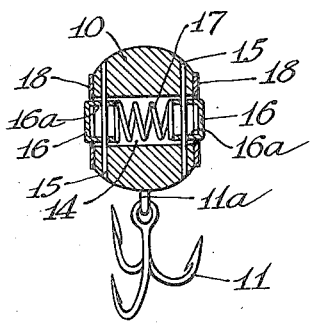
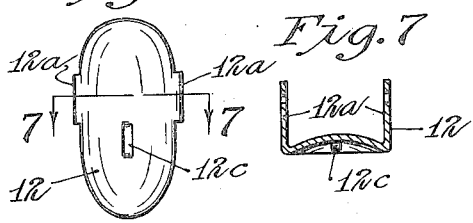
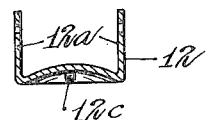
Inventor
Menser M. Peterson
By his Attorneys
Williamson & Williamson Patented Mar. 31, 1936

2,036,075

UNITED STATES PATENT OFFICE 2,036,075

FISH LURE

Menser M. Peterson, Cokato, Minn., assignor of one-half to Luther C. Peterson, Cokato, Minn.

Application May 31, 1933, Serial No. 673,641

11 Claims. (Cl. 43—46)

My invention relates to fish lures and particularly to artificial baits for use in bait casting.

An object of my invention is to provide a fish lure which is capable of use in place of a number of conventional lures.

Another object is to provide such a lure whereon the design displayed may be readily changed by means of interchangeable and reversible, removable parts.

Still another object is to provide such a lure having means for producing a lifelike motion and action thereof when the same is drawn through the water.

These and other objects and advantages of the present invention will more fully appear from the following description, made in connection with the accompanying drawing, wherein like reference characters refer to the same or similar parts throughout the various views, and, in which, Fig. 1 is a side view of my fish lure, in which the movable deflecting plate is shown in full lines in one of its extreme positions and in dotted lines in the other of its extreme positions;

Fig. 2 is a top view;

Fig. 3 is a vertical transverse sectional view taken along the line 3—3 of Fig. 2, as indicated by the arrows;

Fig. 4 is a view of one of the removable colored plates used with my lure;

Fig. 5 is a partial horizontal sectional view showing the retaining members by means of which the removable plates are attached to my lure;

Fig. 6 is a front view of the deflecting plate on the forward end of the lure; and Fig. 7 is a transverse sectional view of the deflecting plate taken along the line 7—7 of Fig. 6, as indicated by the arrows.

Referring to the drawing, my fish lure includes an elongated body 10 formed of wood or other suitable preferably buoyant material and shaped, as shown, to resemble the body of a minnow. A pair of treble hooks 11, of conventional form, are swingably attached to the body 10 respectively, at the rear end thereof and at the medial portion of the lower side thereof by means of screw eyes 11a. The forward end of the body 10 has a downwardly and forwardly sloping concave groove 10a therein.

A concave deflecting plate 12, located just forwardly of the forward end of the body 10, has a pair of ears 12a extending rearwardly from the respective side edges thereof at a point slightly above the center of the plate. Each of the ears 12a is apertured adjacent the outer end thereof and screws 12b extend through the apertured portions into respective sides of the forward portion of the body 10 to connect the plate 12 to the body for swinging movement upwardly and downwardly with respect thereto. Slightly below the center of the plate 12 a loop or ring 12c is formed for the purpose of connecting a casting line, such as the line 13, to the swingable plate 12.

A horizontally disposed aperture 14 extends transversely through the body 10 a short distance behind the forward end thereof. A vertically disposed pivot pin 15, having its end portions embedded in the body 10 and its medial portion disposed diametrically of the aperture 14, extends through the aperture 14 adjacent each end thereof. A flat retaining member 16, having a channel-shaped portion 16a at one end thereof, is mounted on each of the pivot pins 15, as shown, so as to be swingable about the pin in a horizontal plane. The forward end of the channel-shaped portion 16a is closed by a flat piece 16b. A helical compression spring 17 is disposed in compressed condition in the aperture 14 between the portions 16a of the respective retaining members 16 to exert outwardly directed pressure on each of the portions 16a so as to hold the retaining members either in retaining position, as shown in Fig. 5, or in releasing position, swung ninety degrees forwardly from the position shown in Fig. 5 and to provide snap action when the retaining members or either thereof are moved from one to the other of their positions.

A plate 18 formed of sheet metal or other suitable material and shaped as shown in Fig. 4, is provided for attachment to each side of the body 10. Each plate 18 is provided with a rectangular aperture 18a near its forward end for engagement with one of the retaining members 16, and an aperture 18b near its rear end for engagement with a screw 19. The rearmost portion of the aperture 18b is circular in shape and has a diameter slightly greater than that of the head of the screw 19 and the forward portion of the aperture is in the form of an elongated slot having a width smaller than the diameter of the head of the screw 19 and slightly greater than the diameter of the neck of the screw. Each screw 19 is driven into one of the respective sides of the body 10 with its head spaced from the side of the body a distance slightly greater than the thickness of the plate 18 in the location shown in Figs. 1 and 2.

To attach one of the plates 18 to the body 10, one of the retaining members 16 is moved to its outwardly extending and forwardly swung position. The rectangularly apertured portion 18a of the plate 18 is slipped over the retaining member 16 and the circular portion of the aperture 18b of the plate is slipped over the head of the screw 19. The plate is then slid rearwardly a short distance so that the neck of the screw 19 will be disposed in the narrow elongated portion of the aperture 18b and the head of the screw 19 will engage portions of the plate adjacent the aperture to restrain the plate against outward movement. The retaining member 16 is then moved to its retaining position, as shown in Figs. 1, 2, 3 and 5, wherein it will retain the forward portion of the plate 18 against outward movement and wherein the rear ends of the flanges of the channel-like portion 16a of the retaining member will prevent forward movement of the plate. The retaining members 16, when in their retaining position, present the appearance of the fins of a minnow. The rear ends of the retaining members are out-turned slightly for ease in operating the same and also to cause a slight swirl in the water corresponding to the swirl created by the fins of a live minnow when the lure is drawn through the water.

The body 10 of the lure may, of course, be painted or enamelled with any desired color or combination of colors. In the particular form shown, the forward or head portion of the body 10 has a different color than the remaining portions of the body.

The retaining members 16 and the deflector plate 12 may either be plated and polished to present a light reflecting surface, or may be enamelled with any desired colors or designs.

The side plates may also either be plated and polished to present a light reflecting surface or may be enamelled with any desired color or combination of colors. Solid colors, stripes, or a mottled effect may be used. (The plate shown in Fig. 1 is provided with diagonal stripes and the plate shown in Fig. 4 is provided with a mottled color scheme.) It is intended that a number of pairs of plates 18 be provided, each pair having a different coloring than the others. Each plate may have a different color combination on each of its sides and of course may be attached to the body 10 with either of its sides facing outwardly. Also a plate having one color combination may be used on one side of the lure and a plate having a different color combination may be used on the other side. The lure may, of course, be used with no plates 18 attached to it or may be used with a plate attached to only one of its sides.

A series of pairs of side plates 18 having respective pairs formed of metals having various specific gravities so as to have various weights and hence to provide for operation of the lure at various depths in the water may be provided in addition to plates having various color combinations.

It is obvious that a single lure of the form described including a set of pairs of side plates having various color combinations and various weights will supplant a considerable number of conventional lures.

In normal use of my lure, when the line 13 is pulled steadily, the deflecting plate will obviously be tilted upwardly to its upper limit of movement and is in such position as to cause the lure to be held a substantial distance under the water or, if the line is pulled rapidly, to descend further into the water or to dive. When the line is alternately pulled and allowed to slacken, the above described action will occur during the pulling portion of the cycle. During the slackening portion of the cycle, when the lure is coasting through the water, the pressure of the water against the larger portion of the deflector below its pivot will cause the deflector to be tilted downwardly to its lower limit of movement and in this position the deflector will produce substantially no downwardly deflecting action and will hence allow the lure to move rapidly upwardly in the water due to the buoyance of the body 10. The result will be that the lure will alternately ascend and descend in the water in a very lifelike manner. The heads of the screws 19 will split or divert the flow of water past the sides of the lure and thus cause swirls and disturbances in the water about the rear or tail portion of the lure to further enhance the lifelike appearance and action of the lure. It will be obvious that by giving the line quick short jerks, the deflector plate will be alternately caused to swing up and down to produce a lifelike movement of the lure which will attract fish thereto. The concave curvature of the deflector plate 12 will cause the lure to have a wobbler action.

It is apparent that I have invented a novel, efficient, and inexpensive form of fish lure capable of replacing a number of lures of conventional form and capable of producing a lifelike action and movement when drawn through the water.

It will, of course, be understood that various changes may be made in the form, details, arrangement and proportions of the various parts without departing from the scope of the present invention.

What is claimed is:—

1. In a fish lure, an elongated body, a substantially flat reversible plate having different designs to attract fish on its two sides, and means for releasably attaching said plate to said body to expose a preferred side of said plate.

2. In a fish lure, an elongated minnow-like body, a pair of substantially flat reversible plates each having different designs on its two sides and means for removably attaching said plates to the sides of said body with either side of each plate disposed outwardly to expose the desired sides of said plates.

3. In a fish lure, an elongated minnow-like body, a pair of plates designed to attract fish for attachment to the respective sides of said body in substantially flush relation therewith, each of said plates having an aperture therethrough, a fin-like swingable retaining member at each side of said body adapted to be extended through the aperture in one of said plates and then swung rearwardly into substantially flush relation with said plate to retain the same in substantially flush relation with the side of said body, and means for holding said retaining member in retaining position.

4. The structure defined in claim 3, and each of said plates having a longitudinal slot in the rear portion thereof, the rear end portion of said slot being of increased size, and a headed element protruding from the rear portion of each side of said body to be received within the rear end portion of said slot.

5. In a fish lure, an elongated minnow-like body, a pair of plates designed to attract fish for attachment to the respective sides of said body in substantially flush relation therewith, each of said plates having an aperture therethrough, said body being provided with a transverse aperture therethrough, a fin-like retaining member pivoted at one end in the outer portion of each end of said transverse aperture, resilient means in said transverse aperture bearing against the pivoted ends of said retaining members, the pivoted end of each of said retaining members being suitably shaped for cam action in cooperation with said resilient means to hold said retaining members either extending rearwardly along the side of said body or extending laterally outwardly from said body whereby the apertured portion of one of said plates may be placed on one of said retaining members when the same is extended laterally and said retaining member may be swung to its rearwardly extending position wherein it will retain said plate in substantially flush relation to the side of said body.

6. A fish lure comprising an elongated body, hooks attached to the bottom of said body, a series of pairs of substantially flat plates respectively differently designed to attract fish each pair being adapted to be applied against the two sides of said body one at either side of said hooks, and quickly releasable means for removably securing said plates in position whereby one pair of plates may be quickly replaced by another of said pairs to change the appearance of said lure.

7. A fish lure comprising an elongated body having a head at its forward end provided with a downwardly and forwardly inclined groove, a plate having a forwardly facing concave portion partially received within said groove, said plate being pivoted to said head for upward and downward swinging movement, the pivot being disposed above the center of mass of the plate between the two ends thereof, and means on said plate below the point at which it is pivotally connected for attachment of a fishing line thereto.

8. In a fish lure, an elongated body, a rigid, substantially flat reversible plate having different fish-attracting designs on its respective sides, said plate being adapted to be secured to said body with a selected one of its sides facing outwardly, and releasable means for securing said plate to said body.

9. In a fish lure, an elongated body, a plate having a forwardly facing concave portion, said plate being disposed forwardly of the forward end of said body and being pivotally connected above but closely adjacent the transverse median of the plate to the forward end of said body for vertical rocking movement of said plate with respect to said body and means on said plate below the portion at which it is pivotally connected for attachment of a fishing line thereto.

10. In a fish lure, an elongated body, a deflector plate having a forwardly facing concave portion, said plate being disposed forwardly of the forward end of said body and being pivotally connected to the forward end of said body above but closely adjacent the transverse median of the plate for vertical rocking movement of said plate relative to said body, and means on said plate below its transverse median for the attachment of a fishing line thereto.

11. In a fish lure, an elongated body, a deflector plate disposed forwardly of the forward end of said body, rearwardly projecting horizontally aligned and spaced elements carried by said plate above but closely adjacent the transverse median of the plate, said elements being pivotally connected to the forward end of said body whereby said plate may rock vertically relative to said body, and means on said plate below said elements for the attachment of a fishing line thereto.

MENSER M. PETERSON.